(12) United States Patent
Jun et al.

(10) Patent No.: US 10,875,980 B2
(45) Date of Patent: *Dec. 29, 2020

(54) REINFORCING MATERIAL FOR RUBBER COMPRISING ALUMINOSILICATE PARTICLES AND RUBBER COMPOSITION FOR TIRES COMPRISING THE SAME

(71) Applicant: LG Chem, Ltd., Seoul (KR)

(72) Inventors: Shin Hee Jun, Daejeon (KR); Ha Na Lee, Daejeon (KR); Kwon Il Choi, Daejeon (KR); Woo Seok Kim, Daejeon (KR); Han Nah Jeong, Daejeon (KR); Myounghwan Oh, Daejeon (KR)

(73) Assignee: LG Chem, Ltd.

( * ) Notice: Subject to any disclaimer, the term of this patent is extended or adjusted under 35 U.S.C. 154(b) by 161 days.

This patent is subject to a terminal disclaimer.

(21) Appl. No.: 16/070,645

(22) PCT Filed: Sep. 4, 2017

(86) PCT No.: PCT/KR2017/009657
§ 371 (c)(1),
(2) Date: Jul. 17, 2018

(87) PCT Pub. No.: WO2018/048158
PCT Pub. Date: Mar. 15, 2018

(65) Prior Publication Data
US 2020/0131330 A1    Apr. 30, 2020

(30) Foreign Application Priority Data

Sep. 9, 2016  (KR) .................. 10-2016-0116739
Sep. 1, 2017  (KR) .................. 10-2017-0112076

(51) Int. Cl.
| | | |
|---|---|---|
| *C08K 3/34* | (2006.01) | |
| *B60C 1/00* | (2006.01) | |
| *C01B 33/26* | (2006.01) | |
| *C08L 9/06* | (2006.01) | |
| *C08L 7/00* | (2006.01) | |
| *C08L 9/02* | (2006.01) | |

(52) U.S. Cl.
CPC .............. *C08K 3/34* (2013.01); *B60C 1/00* (2013.01); *C01B 33/26* (2013.01); *C08L 7/00* (2013.01); *C08L 9/02* (2013.01); *C08L 9/06* (2013.01); *C01P 2002/72* (2013.01); *C01P 2004/03* (2013.01); *C01P 2004/64* (2013.01); *C01P 2006/12* (2013.01); *C01P 2006/16* (2013.01); *C08K 2003/343* (2013.01); *C08K 2201/003* (2013.01); *C08K 2201/005* (2013.01); *C08K 2201/006* (2013.01); *C08K 2201/011* (2013.01)

(58) Field of Classification Search
CPC ....... B60C 1/00; C01B 33/26; C01P 2002/72; C01P 2004/64; C01P 2006/16; C01P 2004/03; C01P 2006/12; C08K 3/34; C08K 2201/011; C08K 2003/343; C08K 2201/005; C08K 2201/006; C08K 2201/003; C08L 7/00; C08L 9/02; C08L 9/06

See application file for complete search history.

(56) References Cited

U.S. PATENT DOCUMENTS

| | | | |
|---|---|---|---|
| 4,929,431 A * | 5/1990 | Hagiwara | ............... C09C 1/405 |
| | | | 423/328.1 |
| 4,987,162 A | 1/1991 | Wason | |
| 5,919,427 A | 7/1999 | Harada et al. | |
| 6,096,820 A | 8/2000 | Lockledge et al. | |
| 6,200,919 B1 | 3/2001 | Singh et al. | |
| 7,256,233 B2 | 8/2007 | Simonot et al. | |
| 9,238,219 B2 | 1/2016 | Kubota et al. | |
| 9,895,683 B2 | 2/2018 | Kubota et al. | |
| 2006/0009564 A1 | 1/2006 | Simonot et al. | |
| 2006/0052274 A1 | 3/2006 | Stebbing et al. | |
| 2006/0269472 A1 | 11/2006 | Mackinnon et al. | |
| 2008/0006377 A1 | 1/2008 | Stebbing et al. | |
| 2009/0242847 A1 * | 10/2009 | Hosoya | ................... G02F 1/167 |
| | | | 252/500 |
| 2010/0189620 A1 | 7/2010 | Lemon et al. | |
| 2010/0221297 A1 * | 9/2010 | Arakawa | ............... A61K 8/9711 |
| | | | 424/401 |
| 2011/0037023 A1 | 2/2011 | Stebbing et al. | |

(Continued)

FOREIGN PATENT DOCUMENTS

| | | |
|---|---|---|
| CN | 1100438 A | 3/1995 |
| CN | 1054354 C | 7/2000 |

(Continued)

OTHER PUBLICATIONS

Extended European Search Report and Written Opinion for EP Application No. 17849041.3, dated Dec. 13, 2018.
Extended European Search Report and Written Opinion for EP Application No. 17849042.1, dated Dec. 13, 2018.
Chinese Search Report for Application No. CN201780010170.X dated Dec. 3, 2019.
International Search Report for Application No. PCT/KR2017/009656 dated Dec. 7, 2017.
International Search Report for Application No. PCT/KR2017/009657 dated Dec. 7, 2017.

(Continued)

*Primary Examiner* — Patrick D Niland
(74) *Attorney, Agent, or Firm* — Lerner, David, Littenberg, Krumholz & Mentlik, LLP (57) ABSTRACT

The present disclosure relates to a reinforcing material for rubber including aluminosilicate particles and a rubber composition for tires including the same. The reinforcing material for rubber according to the present disclosure exhibits excellent dispersibility in the rubber composition and reinforcing effect, and thus can be suitably used for eco-friendly tires requiring high efficiency and high fuel efficiency characteristics.

5 Claims, 8 Drawing Sheets

(56) References Cited

U.S. PATENT DOCUMENTS

| | | | | |
|---|---|---|---|---|
| 2011/0224117 | A1* | 9/2011 | Mitsuishi | B41J 2/16552 510/170 |
| 2013/0055924 | A1 | 3/2013 | Seo et al. | |
| 2014/0342156 | A1 | 11/2014 | Seo et al. | |
| 2019/0375645 | A1* | 12/2019 | Choi | C01B 33/26 |
| 2020/0010329 | A1* | 1/2020 | Choi | B60C 1/00 |
| 2020/0024430 | A1 | 1/2020 | Choi et al. | |

FOREIGN PATENT DOCUMENTS

| | | |
|---|---|---|
| CN | 1365375 A | 8/2002 |
| CN | 1708621 A | 12/2005 |
| CN | 1798700 A | 7/2006 |
| CN | 1997592 A | 7/2007 |
| CN | 102530978 B | 4/2014 |
| EP | 0235431 A2 | 9/1987 |
| EP | 0593014 A1 | 4/1994 |
| EP | 0995775 A1 | 4/2000 |
| EP | 1219676 B1 | 7/2008 |
| JP | H0762142 A | 3/1995 |
| JP | 2509214 B2 | 6/1996 |
| JP | 2000119444 A | 4/2000 |
| JP | 2000233919 A | 8/2000 |
| JP | 2001072802 A | 3/2001 |
| JP | 3700964 B2 | 9/2005 |
| JP | 2006510766 A | 3/2006 |
| JP | 2010090289 A | 4/2010 |
| JP | 4633471 B2 | 2/2011 |
| JP | 4674896 B2 | 4/2011 |
| JP | 5474293 B2 | 4/2014 |
| JP | 6083903 B2 | 2/2017 |
| KR | 100388525 B1 | 10/2003 |
| KR | 101037143 B1 | 5/2011 |
| KR | 20170048850 A | 5/2017 |
| KR | 20180028927 A | 3/2018 |
| WO | 2015191817 A1 | 12/2015 |
| WO | 2016064138 A1 | 4/2016 |

OTHER PUBLICATIONS

Kay Saalwächter., "Microstructure and Molecular Dynamics of Elaslomers as Studied by Advanced Low-Resolution Nuclear Magnetic Resonance Methods", Rubber Chemistry and Technology, Feb. 2012, vol. 85, No. 3, pp. 350-386.

* cited by examiner

REINFORCING MATERIAL FOR RUBBER COMPRISING ALUMINOSILICATE PARTICLES AND RUBBER COMPOSITION FOR TIRES COMPRISING THE SAME

CROSS-REFERENCE TO RELATED APPLICATION

The present application is a national phase entry under 35 U.S.C. § 371 of International Application No. PCT/KR2017/009657, filed on Sep. 4, 2017, which claims the benefits of Korean Patent Application No. 10-2016-0116739, filed on Sep. 9, 2016, and No. 10-2017-0112076, filed on Sep. 1, 2017, the disclosures of which are incorporated herein by reference.

TECHNICAL FIELD

The present disclosure relates to a reinforcing material for rubber including aluminosilicate particles, and a rubber composition for tires including the same.

BACKGROUND OF ART

As concerns about global warming and environmental problems spread, environment-friendly concepts of increasing energy efficiency and reducing carbon emissions have attracted attention in various fields. These environment-friendly concepts are becoming evident in the tire industry by developing highly efficient eco-friendly tires and recycling waste tires.

Eco-friendly tires (or green tires) are tires that can reduce rolling resistance of rubber to achieve high efficiency and high fuel efficiency, resulting in a reduction in carbon emissions. Modified rubber materials and rubber reinforcing white additives (for example, precipitated silica) have been mainly used for manufacturing such eco-friendly tires.

Generally, silica materials have a problem that dispersibility in the rubber composition is low so that abrasion resistance is deteriorated. In order to compensate for this, it is known that a highly dispersed precipitated silica having specific conditions can be used together with a silane coupling agent to make a material for eco-friendly tires having good abrasion resistance.

On the other hand, there is also a high interest in additives such as the highly dispersed precipitated silica which may have good conflicting properties (mechanical strength such as rolling resistance and abrasion resistance). It is known that even when alumina, clay, kaolin, or the like is applied as the rubber reinforcing white additive, it can be used as an eco-friendly tire material by lowering rolling resistance. However, the rubber reinforcing white additive has a problem that the dispersibility decreases due to formation of a strong aggregate and the like, resulting in problems such as deterioration of mechanical strength.

PRIOR ART DOCUMENTS

Non-Patent Documents (Non-Patent Document 1) Kay Saalwachter, Microstructure and molecular dynamics of elastomers as studied by advanced low-resolution nuclear magnetic resonance methods, Rubber Chemistry and Technology, Vol. 85, No. 3, pp. 350☐386 (2012).

DETAILED DESCRIPTION OF THE INVENTION

Technical Problem

The present disclosure is to provide a reinforcing material for rubber capable of imparting excellent reinforcing effect and processability to tires.

In addition, the present disclosure is to provide a rubber composition for tires including the reinforcing material for rubber.

Technical Solution

According to the present disclosure, a reinforcing material for rubber including amorphous aluminosilicate particles having a composition of the following Chemical Formula 1, wherein the aluminosilicate particles satisfy the following conditions, is provided:

in a data plot obtained by X-ray diffraction (XRD), a full width at half maximum (FWHM) in a 2θ range of 20° to 37° is 3° to 8.5°, and a maximum peak intensity ($I_{max}$) is in a 2θ range of 26° to 31°, an average primary particle diameter is 10 to 100 nm, a Brunauer-Emmett-Teller surface area ($S_{BET}$) is 80 to 250 m²/g, an external specific surface area ($S_{EXT}$) is 60 to 200 m²/g according to an analysis of nitrogen adsorption/desorption, and a volume of micropores ($V_{micro}$) 1 having a pore size of less than 2 nm calculated from the $S_{BET}$ by a t-plot method is less than 0.05 cm³/g.

$$M_{x/n}[(AlO_2)_x(SiO_2)_y]\cdot m(H_2O) \qquad \text{[Chemical Formula 1]}$$

In Chemical Formula 1,

M is an element selected from the group consisting of Li, Na, K, Rb, Cs, Be, and Fr, or an ion thereof;

x>0, y>0, n>0, and m≥0;

1.0≤y/x≤5.0; and 0.5≤x/n≤1.2.

In addition, according to the present disclosure, a rubber composition for tires including the reinforcing material for rubber is provided.

Hereinafter, the reinforcing material for rubber and the rubber composition for tires including the same according to the exemplary embodiments of the present disclosure will be described in more detail.

In this specification, the terms are used merely to refer to specific embodiments, and are not intended to restrict the present disclosure unless that is explicitly expressed.

Singular expressions of the present disclosure may include plural expressions unless that is differently expressed contextually.

The terms ☐include☐, ☐comprise☐, and the like of the present disclosure are used to specify certain features, regions, integers, steps, operations, elements, and/or components, and these do not exclude the existence or the addition of other certain features, regions, integers, steps, operations, elements, and/or components.

I. The Reinforcing Material for Rubber

According to an embodiment of the present disclosure, a reinforcing material for rubber including amorphous aluminosilicate particles having a composition of the following Chemical Formula 1, wherein the aluminosilicate particles satisfy the following conditions, is provided.

In a data plot obtained by X-ray diffraction (XRD), a full width at half maximum (FWHM) in a 2θ range of 20° to 37° is 3° to 8.5°, and a maximum peak intensity ($I_{max}$) is in a 2θ range of 26° to 31°, an average primary particle diameter is 10 to 100 nm, a Brunauer-Emmett-Teller surface area ($S_{BET}$) is 80 to 250 m²/g, an external specific surface area ($S_{EXT}$) is 60 to 200 m²/g according to an analysis of nitrogen adsorption/desorption, and a volume of micropores ($V_{micro}$) 1 having a pore size of less than 2 nm calculated from the $S_{BET}$ by a t-plot method is less than 0.05 cm³/g.

[Chemical Formula 1]

In Chemical Formula 1,

M is an element selected from the group consisting of Li, Na, K, Rb, Cs, Be, and Fr, or an ion thereof;

x>0, y>0, n>0, and m≥0;

1.0≤y/x≤5.0; and 0.5≤x/n≤1.2.

As a result of studies by the present inventors, it was confirmed that the aluminosilicate particles satisfying the above-mentioned characteristics can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

Conventional aluminosilicates do not easily disperse in the rubber composition even when a coupling agent for improving the dispersibility is used, because aggregation of the particles occurs strongly during the dispersion in the rubber composition. However, the aluminosilicate particles satisfying the above-mentioned characteristics can achieve excellent dispersibility similar to that of silica, while improving the reinforcing effect and reducing the rolling resistance.

According to the present disclosure, the aluminosilicate particles contained in the reinforcing material for rubber are amorphous.

In particular, the amorphous aluminosilicate particles according to the embodiment of the present disclosure are characterized in that a full width at half maximum (FWHM) in a 2θ range of 20° to 37° in a data plot obtained by X-ray diffraction (XRD) satisfies 3° to 8.5°, which can exhibit excellent physical properties as a reinforcing material.

Preferably, the FWHM is 3° or more, 3.5° or more, 4.0° or more, 4.5° or more, 5.0° or more, 5.5° or more, or 6.0° or more. In addition, preferably, the FWHM is 8.5° or less, 8.0° or less, 7.5° or less, or 7.0° or less.

The full width at half maximum (FWHM) is a numerical value of a peak width at half of the maximum peak intensity in the 2θ range of 20° to 37° obtained by X-ray diffraction of the aluminosilicate particles.

The unit of the full width at half maximum (FWHM) can be expressed in degrees)(° which is the unit of 2θ. Compounds having high crystallinity may have a small FWHM value.

In addition, the amorphous aluminosilicate particles according to the embodiment of the present disclosure are characterized in that a maximum peak intensity ($I_{max}$) is in a 2θ range of 26° to 31° in a data plot obtained by X-ray diffraction (XRD).

Preferably, the maximum peak intensity ($I_{max}$) is in a 2θ range of 26° or more, 27° or more, or 28° or more. In addition, preferably, the maximum peak intensity ($I_{max}$) is in a 2θ range of 31° or less, 30.5° or less, or 30° or less.

For reference, amorphous silica shows $I_{max}$ in a 2θ range of 20° to 25° and amorphous alumina shows $I_{max}$ in a 2θ range of 30° to 40°.

In addition, the aluminosilicate particles have a composition of the following Chemical Formula 1.

[Chemical Formula 1]

In Chemical Formula 1,

M is an element selected from the group consisting of Li, Na, K, Rb, Cs, Be, and Fr, or an ion thereof;

x>0, y>0, n>0, and m≥0;

1.0≤y/x≤5.0; and 0.5≤x/n≤1.2.

That is, the aluminosilicate particles contain a metal element (M) or an ion thereof, an alkali metal or an ion thereof, and in particular, satisfy a composition of 1.0≤y/x≤5.0 and 0.5≤x/n≤1.2.

Specifically, in Chemical Formula 1, y/x is 1.0 or more, 1.15 or more, 1.3 or more, or 1.45 or more, and 5.0 or less, 4.5 or less, 4.0 or less, 3.5 or less, 3.0 or less, 2.5 or less, or 2.0 or less, which may be advantageous for manifesting all of the properties according to the present disclosure.

Specifically, in Chemical Formula 1, x/n is 0.5 or more, 0.55 or more, 0.6 or more, 0.65 or more, 0.7 or more, 0.75 or more, or 0.8 or more, and 1.2 or less, or 1.15 or less, which may be advantageous for manifesting all of the properties according to the present disclosure.

An average primary particle diameter of the whole aluminosilicate particles is 10 to 100 nm, which may be advantageous for manifesting all the properties according to the present disclosure.

Specifically, the average primary particle diameter of the whole aluminosilicate particles is 10 nm or more, 15 nm or more, or 20 nm or more; and 100 nm or less, 80 nm or less, 60 nm or less, or 50 nm or less.

In general, the smaller the particle diameter of the reinforcing material for rubber, the better the reinforcing effect. However, the smaller the particle diameter, the more easily the aggregation phenomenon occurs between the particles in the rubber composition. If such agglomeration becomes severe, phase separation may occur between the reinforcing material for rubber and the rubber components, resulting in a decrease in processability of tires and a difficulty in achieving the desired reinforcing effect.

The aluminosilicate particles may be in the form of primary particles that are substantially non-aggregated in the rubber composition, while being amorphous particles having the above-mentioned composition.

According to the embodiment of the present disclosure, the aluminosilicate particles are characterized in that a Brunauer-Emmett-Teller surface area ($S_{BET}$) is 80 to 250 m²/g, and an external specific surface area ($S_{EXT}$) is 60 to 200 m²/g according to an analysis of nitrogen adsorption/desorption, which may be advantageous for manifesting all the properties according to the present disclosure.

Specifically, the $S_{BET}$ is 80 m²/g or more, 85 m²/g or more, 90 m²/g or more, 95 m²/g or more, or 100 m²/g or more; and 250 m²/g or less, 190 m²/g or less, 180 m²/g or less, 170 m²/g or less, 160 m²/g or less, 150 m²/g or less, or 130 m²/g or less.

Specifically, the $S_{EXT}$ is 60 m²/g or more, 70 m²/g or more, 80 m²/g or more, or 90 m²/g or more; and 200 m²/g or less, 180 m²/g or less, 160 m²/g or less, 140 m²/g or less, or 120 m²/g or less.

Further, the ratio of $S_{BET}$ to $S_{EXT}$ ($S_{EXT}/S_{BET}$) of the aluminosilicate particles is 0.8 to 1.0, which may be advantageous for manifesting all the properties according to the present disclosure. Specifically, the $S_{EXT}/S_{BET}$ is 0.80 or more, 0.81 or more, 0.82 or more, 0.83 or more, or 0.84 or more; and 1.0 or less, 0.99 or less, 0.95 or less, or 0.90 or less.

On the other hand, it is preferable that the content of micropores in the inorganic material used as the reinforcing material for rubber is minimized. This is because the micropores act as defects and can deteriorate the physical properties of the reinforcing material for rubber.

According to an embodiment of the present disclosure, the aluminosilicate particles are characterized in that a volume of micropores ($V_{micro}$) having a pore size of less than 2 nm calculated from the $S_{BET}$ by a t-plot method is less than 0.05 cm³/g, which can exhibit excellent mechanical properties as a reinforcing material for rubber.

Specifically, the $V_{micro}$ is 0.05 cm³/g or less, 0.025 cm³/g or less, 0.02 cm³/g or less, 0.015 cm³/g or less, 0.01 cm³/g or less, 0.007 cm³/g or less, or 0.005 cm³/g or less.

As described above, the reinforcing material for rubber according to the present disclosure includes amorphous aluminosilicate particles having an average primary particle diameter of 100 nm or less. Particularly, the aluminosilicate particles can exhibit excellent dispersibility in the rubber composition while satisfying the above-mentioned specific surface area characteristics. In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

Furthermore, the aluminosilicate particles do not inhibit the progress of the vulcanization process and the curing process of the rubber composition, thereby making it possible to achieve processability of the rubber composition and productivity of the tire manufacturing process using the same.

For example, the aluminosilicate particles satisfying all of the above characteristics may be prepared by a method including the steps of:

[i] adding silicon sources, aluminum sources, and water to a basic or alkaline solution (for example, a sodium hydroxide solution) and stirring to form an Al—O—Si structure of a monomer unit satisfying a specific metal atomic ratio;

[ii] curing the aluminosilicate monomer at low temperature (for example, from room temperature to 90° C.) and atmospheric pressure for 3 to 24 hours to cause an Al—O—Si polymerization reaction;

[iii] washing and drying the polymerized aluminosilicate particles; and

[iv] crushing the dried aluminosilicate particles to control particle size distribution.

The aluminosilicate particles satisfying all of the above characteristics can be obtained by controlling the type of reactants, the molar ratio of reactants, and the reaction conditions to be applied to the formation of the monomer unit in the method.

In the method, fumed silica, rice husk, colloidal silica, cellite, pearlite, rice husk ash, silica fume, organosilane, clay, minerals, meta kaolin, calcined clay, active clay, fly ash, slag, pozzolan, incinerated utility waste, industrial byproducts, glass powder, red mud, or the like may be used as the silicon sources.

In addition, alumina, aluminate, aluminum salt, organic alum inoxane, pearlite, clay, minerals, meta kaolin, calcined clay, active clay, fly ash, slag, pozzolan, incinerated utility waste, industrial byproducts, glass powder, red mud, or the like may be used as the aluminum sources.

II. The Rubber Composition for Tires

According to another embodiment of the present disclosure, a rubber composition for tires including the reinforcing material for rubber is provided.

The reinforcing material for rubber includes the above-described aluminosilicate particles.

The aluminosilicate particles satisfying the above-mentioned characteristics can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

The rubber composition for tires may include a general diene elastomer without any particular limitation.

For example, the diene elastomer may be at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

The rubber composition for tires may also include a coupling agent which provides chemical and/or physical bonding between the reinforcing material for rubber and the diene elastomer. As the coupling agent, conventional components such as a polysiloxane-based compound may be included without particular limitation.

In addition, plasticizers, pigments, antioxidants, ozone deterioration inhibitors, vulcanization accelerators, and the like which are commonly used in the tire industry may be added to the rubber composition for tires.

Advantageous Effects

The aluminosilicate particles included in the reinforcing material for rubber according to the present disclosure can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

BRIEF DESCRIPTION OF THE DRAWINGS

FIG. 14 (a) is an image of the rubber molded product applied with the aluminosilicate particles of Example 2 observed by a transmission electron microscope, and FIG. 14 (b) is an image of the rubber molded product applied with the silica of Example 9 observed by a transmission electron microscope.

DETAILED DESCRIPTION OF THE EMBODIMENTS

Hereinafter, preferred examples are provided for better understanding. However, these examples are for illustrative purposes only, and the invention is not intended to be limited by these examples.

Example 1

23 g of KOH (Daejung Chemicals & Metals) and 27 g of colloidal silica (Ludox HS 30 wt %, Sigma-Aldrich) were completely dissolved in 22 ml of distilled water (DW). 15 g of metakaolin ($Al_2Si_2O_7$, Aldrich) was added to the solution, followed by mixing at 800 rpm for 40 minutes using an overhead stirrer.

This was cured at room temperature of about 25° C. for 24 hours.

The cured product was poured into distilled water at 90° C., stirred for 12 hours, and centrifuged to wash it to about pH 7.

It was confirmed that the washed and dried aluminosilicate had an amorphous structure (FWHM=6.745°, $2\theta@I_{max}$=29.2° in the 2θ range of 20° to 37° of XRD), and a composition of y/x=1.6, x/n=1.12 in Chemical Formula 1.

The aluminosilicate formed in the form of about 20 nm primary particles without forming secondary particles was subjected to specific surface area analysis, and the results were $S_{BET}$=130 m²/g, $S_{EXT}$=110 m²/g, $S_{EXT}/S_{BET}$=0.85, and $V_{micro}$=0.007 cm³/g.

Example 2

23 g of KOH (Daejung Chemicals & Metals) and 27 g of colloidal silica (Ludox HS 30 wt %; Sigma-Aldrich) were completely dissolved in 22 ml of distilled water (DW). 15 g of metakaolin ($Al_2Si_2O_7$, Aldrich) was added to the solution, followed by mixing at 800 rpm for 40 minutes using an overhead stirrer.

This was cured at 70° C. for 4 hours.

The cured product was poured into distilled water at 90° C., stirred for 12 hours, and centrifuged to wash it to about pH 7.

It was confirmed that the washed and dried aluminosilicate had an amorphous structure (FWHM=6.496°, $2\theta@I_{max}$=29.2° in the 2θ range of 20° to 37° of XRD), and a composition of y/x=1.6, x/n=0.8 in Chemical Formula 1.

The aluminosilicate formed in the form of about 20 nm primary particles without forming secondary particles was subjected to specific surface area analysis, and the results were $S_{BET}$=130 m²/g, $S_{EXT}$=110 m²/g, $S_{EXT}/S_{BET}$=0.85, and $V_{micro}$=0.007 cm³/g.

Example 3

23 g of KOH (Daejung Chemicals & Metals) and 27 g of colloidal silica (Ludox HS 30 wt %, Sigma-Aldrich) were completely dissolved in 62 ml of distilled water (DW). 15 g of metakaolin ($Al_2Si_2O_7$, Aldrich) was added to the solution, followed by mixing at 800 rpm for 40 minutes using an overhead stirrer.

This was cured at 70° C. for 4 hours.

The cured product was poured into distilled water at 90° C., stirred for 12 hours, and centrifuged to wash it to about pH 7.

It was confirmed that the washed and dried aluminosilicate had an amorphous structure (FWHM=6.206°, $2\theta@I_{max}$=29.1° in the 2θ range of 20° to 37° of XRD), and a composition of y/x=1.91, x/n=0.88 in Chemical Formula 1.

The aluminosilicate formed in the form of about 30 nm primary particles without forming secondary particles was subjected to specific surface area analysis, and the results were $S_{BET}$=100 m²/g, $S_{EXT}$=90 m²/g, $S_{EXT}/S_{BET}$=0.9, and $V_{micro}$=0.005 cm³/g.

Example 4

23 g of KOH (Daejung Chemicals & Metals) and 33 g of a $Na_2SiO_5$ solution (Aldrich) were completely dissolved in 21 ml of distilled water (DW). 15 g of metakaolin ($Al_2Si_2O_7$, Aldrich) was added to the solution, followed by mixing at 800 rpm for 40 minutes using an overhead stirrer.

This was cured at 70° C. for 4 hours.

The cured product was poured into distilled water at 90° C., stirred for 12 hours, and centrifuged to wash it to about pH 7.

It was confirmed that the washed and dried aluminosilicate had an amorphous structure (FWHM=6.752°, $2\theta@I_{max}$=29.2° in the 2θ range of 20° to 37° of XRD), and a composition of y/x=1.91, x/n=0.88 in Chemical Formula 1.

The aluminosilicate formed in the form of about 30 nm primary particles without forming secondary particles was subjected to specific surface area analysis, and the results were $S_{BET}$=110 m$^2$/g, $S_{EXT}$=100 m$^2$/g, $S_{EXT}/S_{BET}$=0.91, and $V_{micro}$=0.005 cm$^3$/g.

Example 5

12 g of NaOH (Daejung Chemicals & Metals) and 31 g of a Na$_2$SiO$_5$ solution (Aldrich) were completely dissolved in 22 ml of distilled water (DW). 15 g of metakaolin (Al$_2$Si$_2$O$_7$, Aldrich) was added to the solution, followed by mixing at 800 rpm for 40 minutes using an overhead stirrer.

This was cured at room temperature of about 25° C. for 24 hours.

The cured product was poured into distilled water at 90° C., stirred for 12 hours, and centrifuged to wash it to about pH 7.

The washed and dried aluminosilicate had a FAU (faujasite) crystal structure, so the FWHM measurement in the range was not performed. It was confirmed that the aluminosilicate had a composition of y/x=1.31 and x/n=0.91 in Chemical Formula 1.

The aluminosilicate in the form of mostly secondary particles with a particle size of about 150 nm was subjected to specific surface area analysis, and the results were $S_{BET}$=520 m$^2$/g, $S_{EXT}$=190 m$^2$/g, $S_{EXT}/S_{BET}$=0.37, and $V_{micro}$=0.13 cm$^3$/g.

Example 6

12 g of NaOH (Daejung Chemicals & Metals) and 31 g of a Na$_2$SiO$_5$ solution (Aldrich) were completely dissolved in 22 ml of distilled water (DW). 22 g of metakaolin (Al$_2$Si$_2$O$_7$, Aldrich) was added to the solution, followed by mixing at 800 rpm for 40 minutes using an overhead stirrer.

This was cured at room temperature of about 25° C. for 24 hours.

The cured product was poured into distilled water at 25° C., stirred for 12 hours, and centrifuged to wash it to about pH 7.

It was confirmed that the washed and dried aluminosilicate had an amorphous structure (FWHM=3.872°, 2θ@I$_{max}$=29.0° in the 2θ range of 20° to 37° of XRD), and a composition of y/x=1.56, x/n=0.95 in Chemical Formula 1.

The aluminosilicate formed in the form of about 30 nm primary particles without forming secondary particles was subjected to specific surface area analysis, and the results were $S_{BET}$=610 m$^2$/g, $S_{EXT}$=173 m$^2$/g, $S_{EXT}/S_{BET}$=0.28, and $V_{micro}$=0.78 cm$^3$/g.

Example 7

12 g of NaOH (Daejung Chemicals & Metals) and 31 g of a Na$_2$SiO$_5$ solution (Aldrich) were completely dissolved in 22 ml of distilled water (DW). 15 g of metakaolin (Al$_2$Si$_2$O$_7$, Aldrich) was added to the solution, followed by mixing at 800 rpm for 40 minutes using an overhead stirrer.

This was cured at 70° C. for 6 hours.

The cured product was poured into distilled water at 90° C., stirred for 12 hours, and centrifuged to wash it to about pH 7.

The washed and dried aluminosilicate had a FAU (faujasite) crystal structure, so the FWHM measurement in the range was not performed. It was confirmed that the aluminosilicate had a composition of y/x=1.48 and x/n=0.94 in Chemical Formula 1.

The aluminosilicate in the form of about 200 nm secondary particles formed by agglomeration of about 40 nm primary particles was subjected to specific surface area analysis, and the results were $S_{BET}$=660 m$^2$/g, $S_{EXT}$=200 m$^2$/g, $S_{EXT}/S_{BET}$=0.30, and $V_{micro}$=0.19 cm$^3$/g.

Example 8

An aluminosilicate (product name: Zeolex 23A) manufactured by Huber Engineered Materials was prepared.

The aluminosilicate had an amorphous structure in general, but some crystalline structures were mixed and exhibited an XRD pattern (FWHM=8.538°, 2θ@I$_{max}$=23.7° in the 2θ range of 20° to 37° of XRD) different from the particles according to Examples 1 to 4. Further, it was confirmed that the aluminosilicate had a composition of M=Na, y/x=8.63 and x/n=1.05 in Chemical Formula 1.

The aluminosilicate of about 20 nm was subjected to specific surface area analysis, and the results were $S_{BET}$=82.49 m$^2$/g, $S_{EXT}$=74.59 m$^2$/g, $S_{EXT}/S_{BET}$=0.90, and $V_{micro}$=0.003 cm$^3$/g.

Example 9

Silica (product name: 7000GR) manufactured by Evonic was prepared.

The silica had 2θ@I$_{max}$ of 22.2°. It was subjected to specific surface area analysis and the results were $S_{BET}$=175 m$^2$/g, $S_{EXT}$=144 m$^2$/g, $S_{EXT}/S_{BET}$=0.82, and $V_{micro}$=0.012 cm$^3$/g.

Preparation Example 1

137 g of a diene elastomer mixture (SSBR 2550, LG Chemical), 70 g of the aluminosilicate particles according to Example 1 as a reinforcing material, and 11.2 g of a silane coupling agent (polysiloxane-based) were added to a closed mixer. This was mixed at 150° C. for 5 minutes, and then mixed with sulfur and a vulcanization accelerator for 90 seconds.

The resulting mixture was extruded in the form of a sheet having a thickness of 2 to 3 mm, and vulcanized at 160° C. to obtain a rubber molded product. At this time, the vulcanization time was controlled referring to data obtained by measuring the above mixture at 160° C. using a moving die rheometer (MDR).

A bound rubber value of the rubber composition according to Preparation Example 1 was measured as 115. The bound rubber value is a normalized value when the bound rubber value of the rubber including silica is taken as 100.

Preparation Example 2

A rubber composition and a molded product were obtained in the same manner as in Preparation Example 1, except that the aluminosilicate particles according to Example 2 were added as a reinforcing material.

The bound rubber value of the rubber composition according to Preparation Example 2 was measured as 115.

Preparation Example 3

A rubber composition and a molded product were obtained in the same manner as in Preparation Example 1, except that the aluminosilicate particles according to Example 3 were added as a reinforcing material.

The bound rubber value of the rubber composition according to Preparation Example 3 was measured as 93.

Preparation Example 4

A rubber composition and a molded product were obtained in the same manner as in Preparation Example 1, except that the aluminosilicate particles according to Example 4 were added as a reinforcing material.

The bound rubber value of the rubber composition according to Preparation Example 4 was measured as 127.

Preparation Example 5

A rubber composition and a molded product were obtained in the same manner as in Preparation Example 1, except that the aluminosilicate particles according to Example 5 were added as a reinforcing material.

Figure 15:
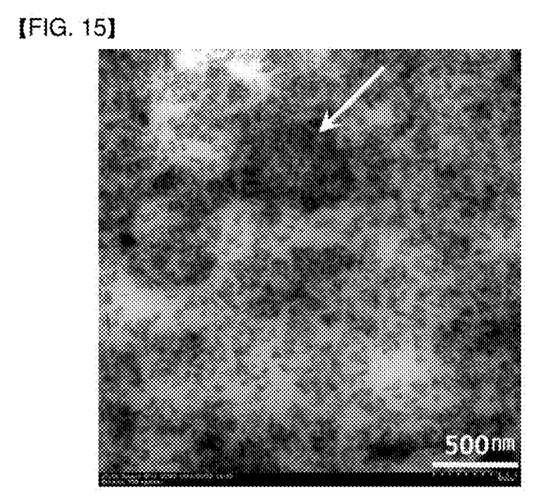
FIG. 15 is an image of the rubber composition of Preparation Example 5 observed by a transmission electron microscope.

However, the rubber composition according to Preparation Example 5 was unable to be evaluated regarding rubber compounding characteristics of the composition due to the increase in agglomeration of the aluminosilicate particles and the decrease in dispersibility during compounding (see agglomerates indicated by an arrow of FIG. 15).

Preparation Example 6

A rubber composition and a molded product were obtained in the same manner as in Preparation Example 1, except that the aluminosilicate particles according to Example 6 were added as a reinforcing material.

However, the rubber composition according to Preparation Example 6 was unable to be evaluated regarding rubber compounding characteristics of the composition due to the increase in agglomeration of the aluminosilicate particles and the decrease in dispersibility during compounding.

Preparation Example 7

A rubber composition and a molded product were obtained in the same manner as in Preparation Example 1, except that the aluminosilicate particles according to Example 7 were added as a reinforcing material.

However, the rubber composition according to Preparation Example 7 was unable to be evaluated regarding rubber compounding characteristics of the composition due to the increase in agglomeration of the aluminosilicate particles and the decrease in dispersibility during compounding.

Preparation Example 8

A rubber composition was obtained in the same manner as in Preparation Example 1, except that the aluminosilicate particles according to Example 8 were added as a reinforcing material.

However, the rubber composition according to Preparation Example 8 was unable to produce a molded product, because the rubber was decomposed at the time of compounding.

Preparation Example 9

A rubber composition and a molded product were obtained in the same manner as in Preparation Example 1, except that the silica particles according to Example 9 were added as a reinforcing material.

Experimental Example 1

Figure 6:
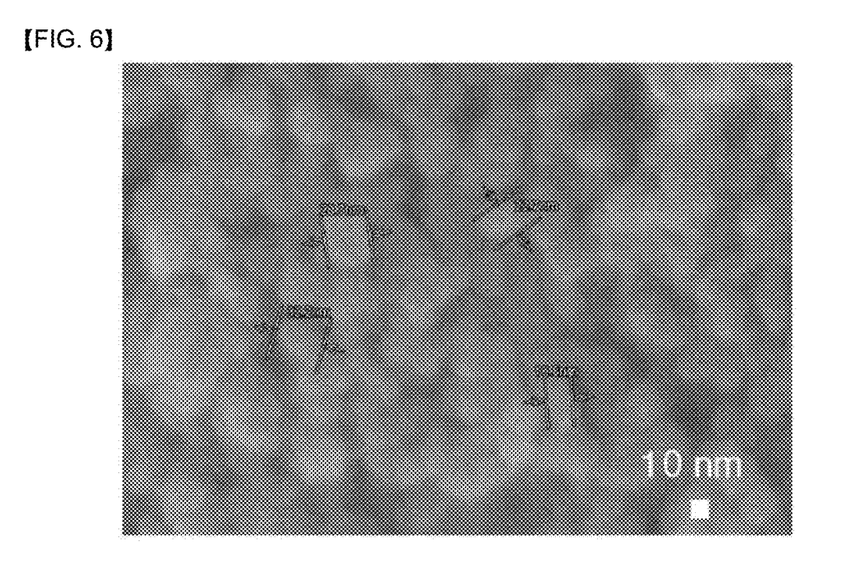
FIG. 6 is a SEM image of the aluminosilicate particles according to Example 1.
Figure 7:
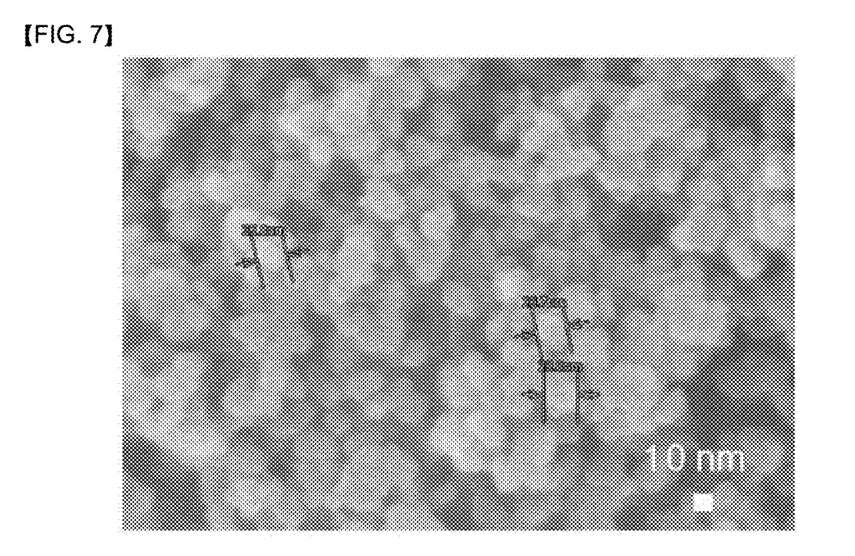
FIG. 7 is a SEM image of the aluminosilicate particles according to Example 2.
Figure 8:
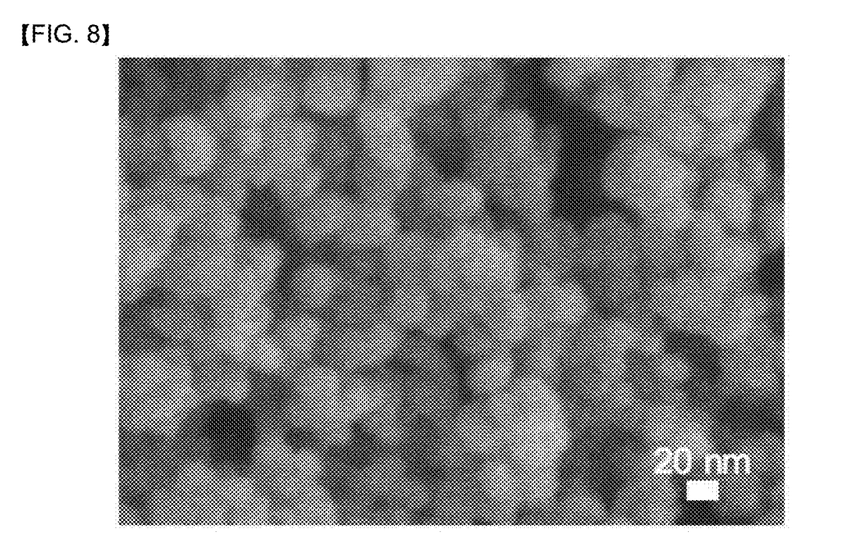
FIG. 8 is a SEM image of the aluminosilicate particles according to Example 3.
Figure 9:
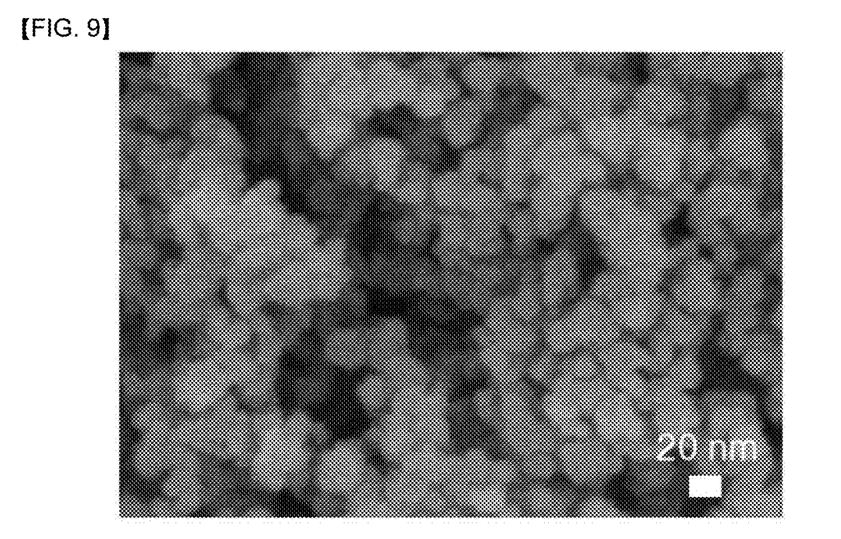
FIG. 9 is a SEM image of the aluminosilicate particles according to Example 4.
Figure 10:
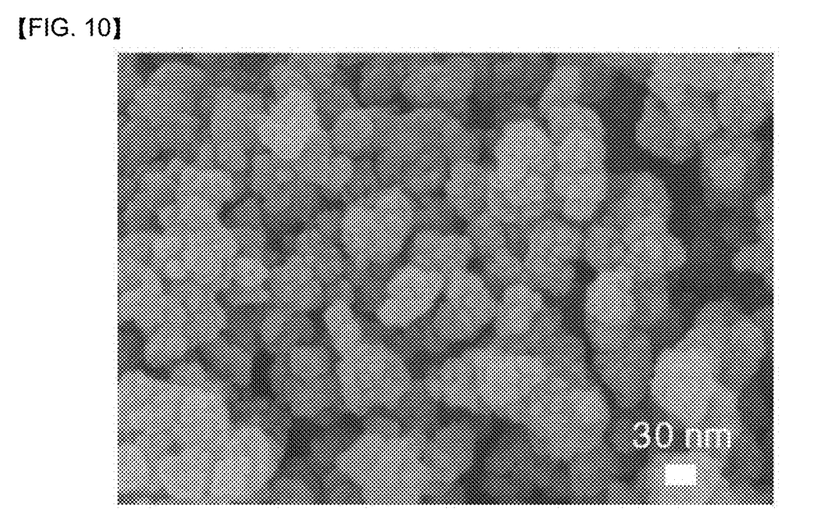
FIG. 10 is a SEM image of the aluminosilicate particles according to Example 5.
Figure 11:
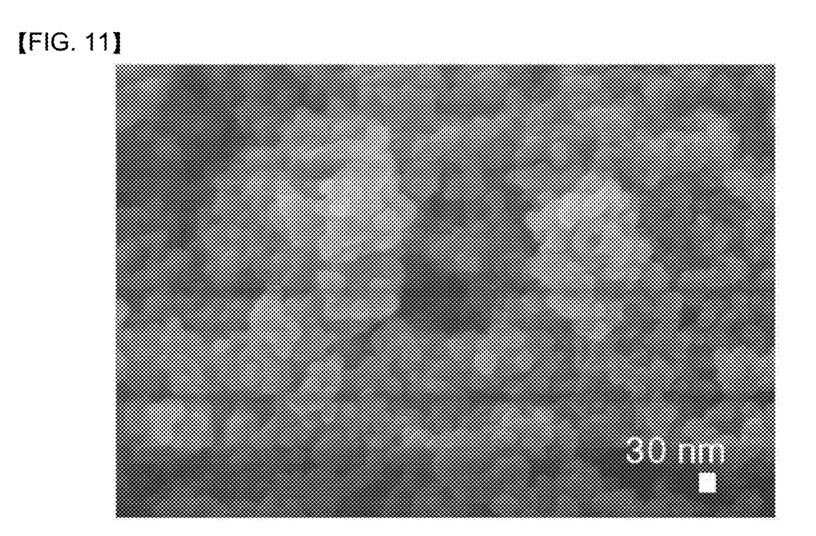
FIG. 11 is a SEM image of the aluminosilicate particles according to Example 6.
Figure 12:
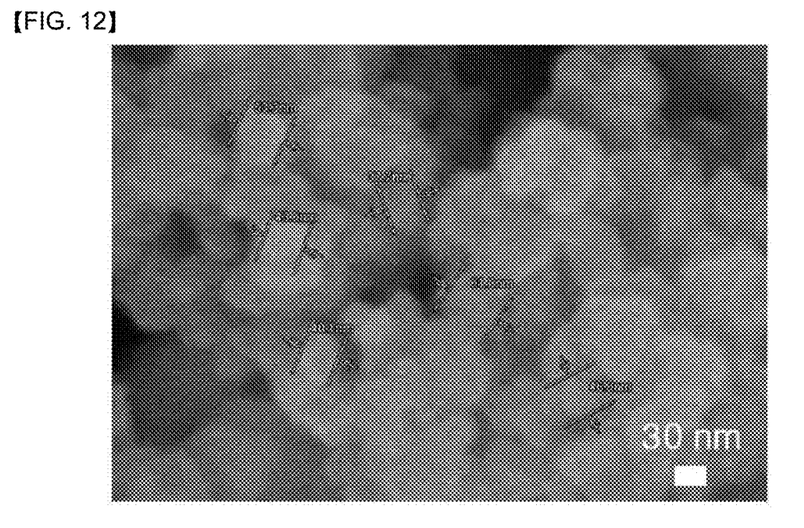
FIG. 12 is a SEM image of the aluminosilicate particles according to Example 7.
Figure 13:
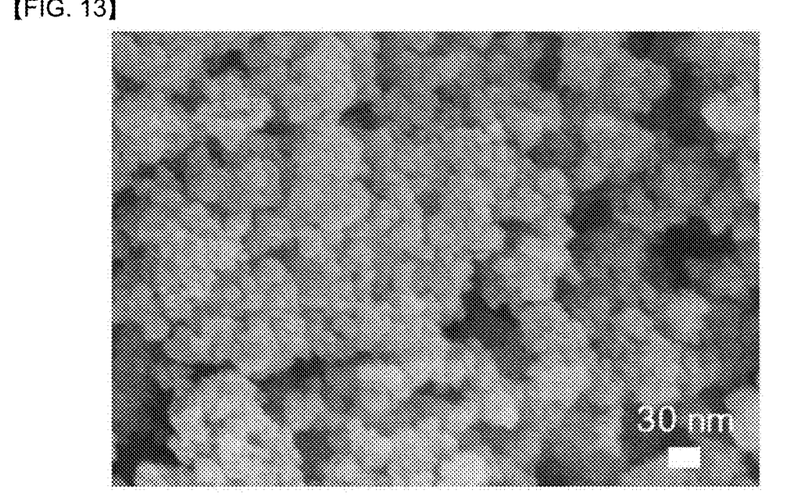
FIG. 13 is a SEM image of the aluminosilicate particles according to Example 8.

(1) The average primary particle diameter and composition of the aluminosilicate particles according to Examples 1 to 8 were confirmed using scanning electron microscopy (SEM) and energy dispersive X-ray spectroscopy (EDS). The photographed SEM images are sequentially shown in FIG. 6 (Example 1) to FIG. 13 (Example 8).

In the measurement of the average primary particle diameter, the particle diameter means a Feret diameter and was calculated as an average of the values obtained by measuring the particle diameters in various directions. Specifically, after obtaining a SEM image in which more than 100 particles were observed, a random straight line was plotted, and the primary particle diameter of the particle was calculated using the length of the straight line, the number of particles included in the straight line, and the magnification. The average primary particle diameter was determined by setting 20 or more of these straight lines.

The EDS was operated under conditions of 15 kV and a working distance of 15 mm.

(2) The nitrogen adsorption/desorption Brunauer-Emmett-Teller surface area ($S_{BET}$) and the external specific surface area ($S_{EXT}$) were measured for each of the particles according to Examples 1 to 8 using a specific surface area analyzer (BEL Japan Inc., BELSORP_MAX). Then, the volume of micropores ($V_{micro}$) having a pore size of less than 2 nm was calculated from the $S_{BET}$ by a t-plot method.

The specific surface area analysis can be performed by measuring the amount of gas adsorption while increasing the gas partial pressure to a saturated vapor pressure ($P_0$) and measuring the amount of gas desorption while reducing the partial pressure after the saturated vapor pressure state ($P/P_0=1$) to obtain an isotherm ads/des graph. Using this, $S_{BET}$ can be obtained by a BET plot, and $S_{EXT}$ and $V_{micro}$ can be calculated by a t-plot.

TABLE 1

| | Diameter (nm) | $S_{BET}$ (m²/g) | $S_{EXT}$ (m²/g) | $S_{EXT}/S_{BET}$ | $V_{micro}$ (cm³/g) |
|---|---|---|---|---|---|
| Example 1 | 20 | 130 | 110 | 0.85 | 0.007 |
| Example 2 | 20 | 130 | 110 | 0.85 | 0.007 |
| Example 3 | 30 | 100 | 90 | 0.90 | 0.005 |
| Example 4 | 30 | 110 | 100 | 0.91 | 0.005 |
| Example 5 | 150 | 520 | 190 | 0.37 | 0.13 |
| Example 6 | 30 | 610 | 173 | 0.28 | 0.78 |
| Example 7 | 40/200 | 660 | 200 | 0.30 | 0.19 |
| Example 8 | 20 | 82.49 | 74.59 | 0.90 | 0.003 |

Experimental Example 2

X-ray diffraction analysis for each aluminosilicate particle according to Examples 1 to 8 was carried out using an X-ray diffractometer (Bruker AXS D4-Endeavor XRD) under an applied voltage of 40 kV and an applied current of 40 mA. The results are shown in Table 2 below.

The measured range of 2θ was 10° to 90°, and it was scanned at an interval of 0.05°. Herein, a variable divergence slit 6 mm was used as a slit, and a large PMMA holder (diameter=20 mm) was used to eliminate background noise due to the PMMA holder.

Figure 1:
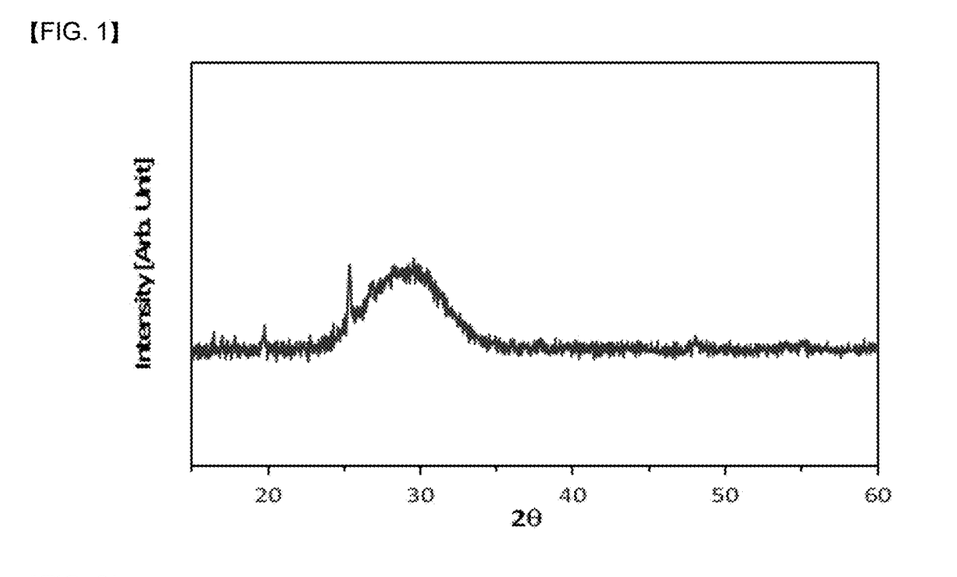
FIG. 1 is a graph showing the results of X-ray diffraction analysis of the aluminosilicate particles according to Example 1.
Figure 2:
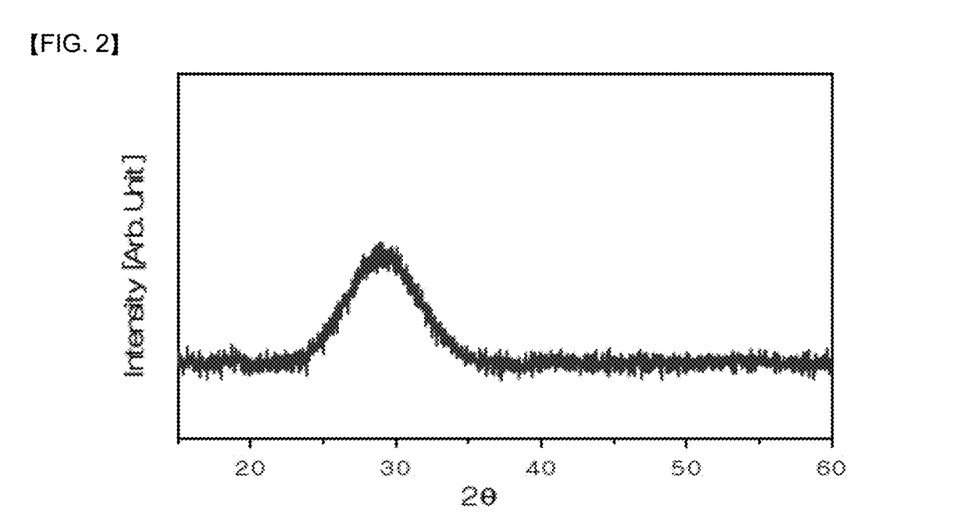
FIG. 2 is a graph showing the results of X-ray diffraction analysis of the aluminosilicate particles according to Example 3.
Figure 3:
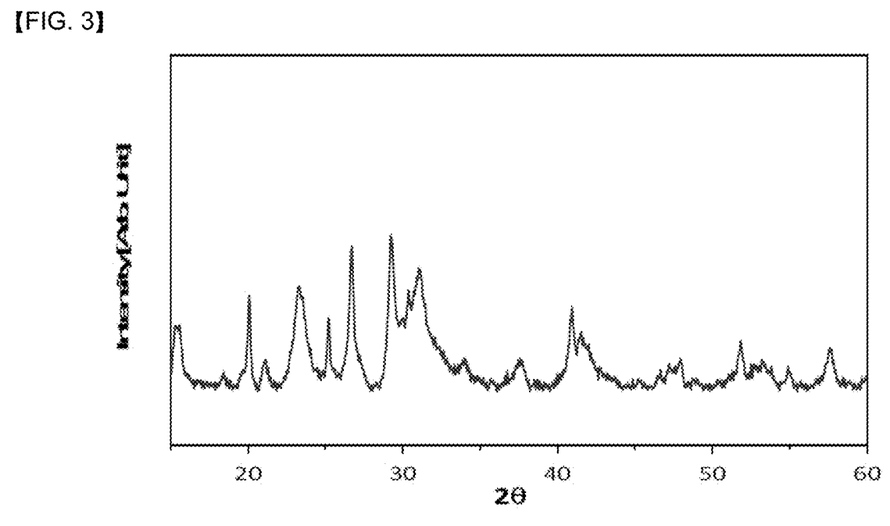
FIG. 3 is a graph showing the results of X-ray diffraction analysis of the aluminosilicate particles according to Example 5.
Figure 4:
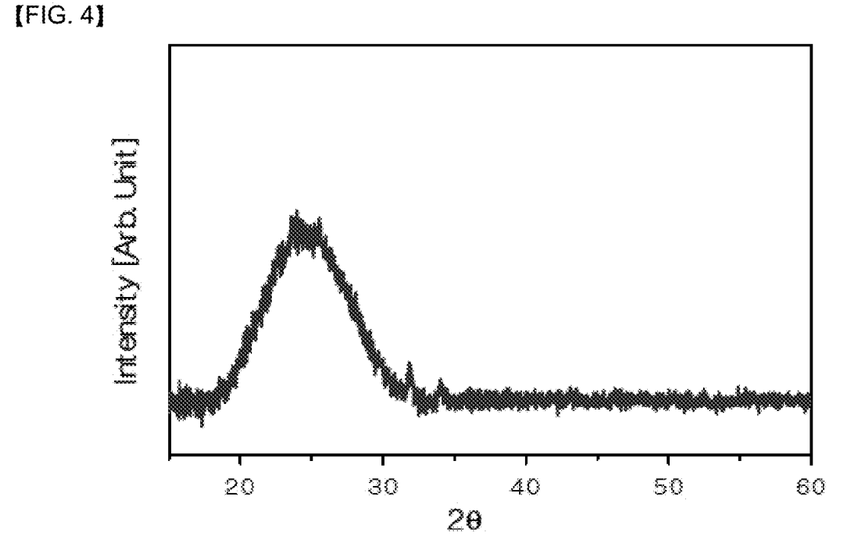
FIG. 4 is a graph showing the results of X-ray diffraction analysis of the aluminosilicate particles according to Example 8.
Figure 5:
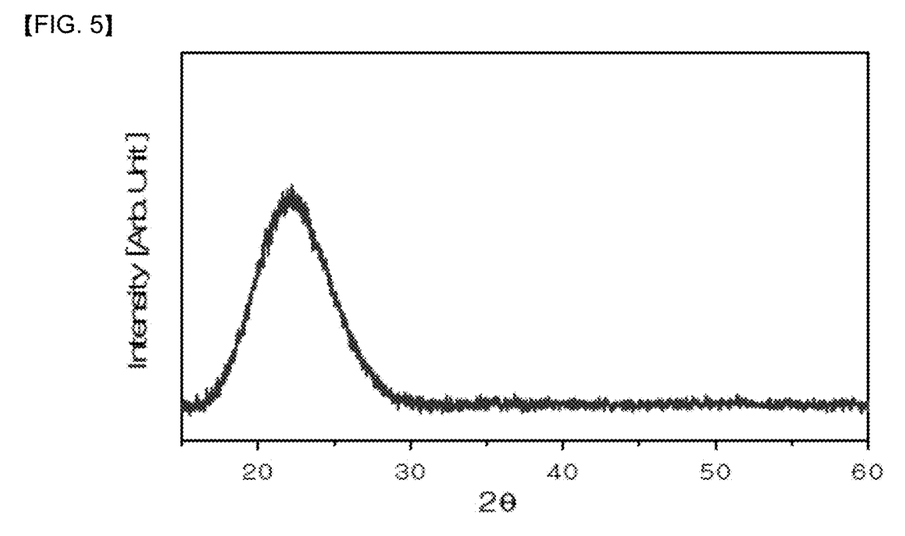
FIG. 5 is a graph showing the results of X-ray diffraction analysis of the aluminosilicate particles according to Example 9.

The data plots obtained by X-ray diffraction are shown in FIG. 1 (Example 1), FIG. 2 (Example 3), FIG. 3 (Example 5), FIG. 4 (Example 8), and FIG. 5 (Example 9).

And, a full width at half maximum (FWHM) at a peak of about 29° which is the maximum peak in the 2θ range of 20° to 37° was calculated in the data plot obtained by X-ray diffraction (XRD).

Experimental Example 3

A Time-Domain NMR (Minispec) was used to obtain signal decay over time by setting the application mode to sc-lc-co at a temperature of 40° C. The bound rubber value can be calculated through double exponential fitting from the measured graph. The bound rubber value of the rubber composition prepared according to the above preparation examples was a normalized value when the calculated silica bound rubber value of the silica-kneaded rubber composition was taken as 100.

The bound rubber is a component formed on the surface of the filler in the unvulcanized rubber composition in which the filler is kneaded, and it is possible to indirectly confirm the reinforcing effect due to the addition of the filler depending on how well it is developed. For example, it is known that as the bound rubber increases, tan(delta) (@60° C.) is low and the rolling resistance of the rubber decreases.

TABLE 2

|  | FWHM (°) | $I_{max}$ (°) | Crystal form | Bound Rubber |
|---|---|---|---|---|
| Example 1 | 6.745 | 29.2 | Amorphous | 115 |
| Example 2 | 6.496 | 29.2 | Amorphous | 115 |
| Example 3 | 6.206 | 29.1 | Amorphous | 93 |
| Example 4 | 6.752 | 29.2 | Amorphous | 127 |
| Example 5 | — | — | FAU-type | — |
| Example 6 | 3.872 | 29.0 | Amorphous | — |
| Example 7 | — | — | FAU-type | — |
| Example 8 | 8.538 | 23.7 | Amorphous | — |

Referring to Table 2, it was confirmed that the rubber compositions of Preparation Examples 1 to 4, to which the aluminosilicate particles of Examples 1 to 4 were applied, exhibited the bound rubber values of 93 to 127, indicating excellent reinforcing effects.

Experimental Example 4

The dispersion state of the rubber molded product (Preparation Example 2) to which the aluminosilicate particles of Example 2 were applied and the rubber molded product (Preparation Example 9) to which the silica of Example 9 was applied was observed using a transmission electron microscope. The results are shown in FIG. 14 (*a*) [Preparation Example 2] and FIG. 14 (*b*) [Preparation Example 9].

Figure 14A:
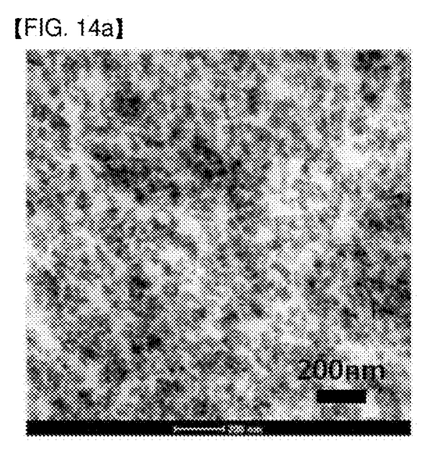
Figure 14B:
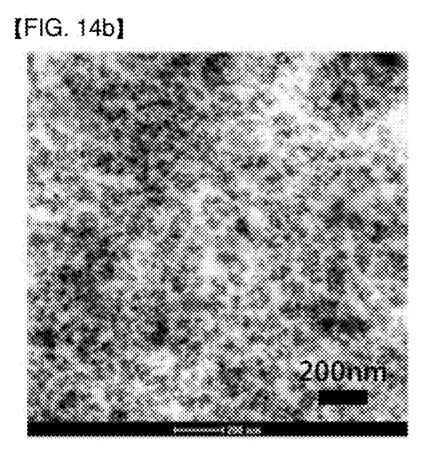

Referring to FIG. 14, it was confirmed that the aluminosilicate particles of Example 2 exhibited dispersibility of equal to or greater than that of silica in the rubber composition.

Experimental Example 5

The particle size distribution of primary particles and secondary particles (aggregates) of aluminosilicate or silica dispersed in the rubber compositions of Preparation Examples 2, 3, and 9 was measured using a small-angle X-ray scattering (SAXS).

Specifically, the beam line image was obtained using u-SAXS beam-line (9A), and particle size analysis was performed using a Beaucage three level model and a sphere model+Beaucage one level model.

TABLE 3

| Particle size analysis | Preparation Ex. 2 | Preparation Ex. 3 | Preparation Ex. 9 |
|---|---|---|---|
| Primary particles (nm) | 16 | 9 | 16 |
| Secondary particles (nm) | 60 | 25 | 70 |

Experimental Example 6

The dynamic loss factor (tan δ) of the rubber molded products of Preparation Examples 2, 3, 4 and 9 was measured under a dynamic strain of 3% and a static strain of 3% using a viscoelasticity measurement apparatus (DMTS 500N, Gabo, Germany). The measured values were normalized based on the value of the rubber molded product of Preparation Example 9, and are shown in Table 4 below.

For reference, the dynamic loss factor (tan δ @0° C.) at 0° C. is related to a wet grip property of tires. It is known that the higher the value, the better the wet grip property. In addition, the dynamic loss factor (tan δ @60° C.) at 60° C. is related to rolling resistance of tires, and it is known that the lower the value, the better the rolling resistance.

TABLE 4

|  | Preparation Ex. 2 | Preparation Ex. 3 | Preparation Ex. 4 | Preparation Ex. 9 |
|---|---|---|---|---|
| tanδ @60° C., index | 107 | 98 | 117 | 100 |
| tanδ @0° C., index | 112 | 112 | 120 | 100 |

Referring to Table 4, it was confirmed that the rubber molded products according to Preparation Examples 2 to 4 exhibit abrasion resistance and wet grip property of equal to or greater than those of the rubber molded product according to Preparation Example 9.

The invention claimed is:

1. A reinforcing material for rubber comprising amorphous aluminosilicate particles having a composition of the following Chemical Formula 1,
wherein the aluminosilicate particles satisfy the following conditions:
in a data plot obtained by X-ray diffraction (XRD), a full width at half maximum (FWHM) in a 2θ range of 20° to 37° is 3° to 8.5°, and a maximum peak intensity ($I_{max}$) is in a 2θ range of 26° to 31°,
an average primary particle diameter is 10 to 100 nm,
a Brunauer-Emmett-Teller surface area ($S_{BET}$) is 80 to 250 m²/g, and an external specific surface area ($S_{EXT}$) is 60 to 200 m²/g according to an analysis of nitrogen adsorption/desorption, and
a volume of micropores ($V_{micro}$) having a pore size of less than 2 nm calculated from the $S_{BET}$ by a t-plot method is less than 0.05 cm³/g:

$$M_{x/n}[(AlO_2)_x(SiO_2)_y] \cdot m(H_2O) \quad \text{[Chemical Formula 1]}$$

wherein, in Chemical Formula 1,
M is an element selected from the group consisting of Li, Na, K, Rb, Cs, Be, and Fr, or an ion thereof;
x>0, y>0, n>0, and m≥0;
1.0≤y/x≤5.0; and
0.5≤x/n≤1.2.

2. The reinforcing material for rubber of claim 1, wherein the aluminosilicate particles satisfy $0.8 \leq S_{EXT}/S_{BET} \leq 1.0$.

3. A rubber composition for tires comprising the reinforcing material for rubber of claim 1.

4. The rubber composition for tires of claim 3, wherein the composition comprises the reinforcing material for rubber and at least one diene elastomer.

5. The rubber composition for tires of claim 4, wherein the diene elastomer is at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

* * * * *